March 11, 1924.

R. ASCHENBACH

CHICKEN BROODER

Filed April 12, 1923

Inventor
R. Aschenbach
By D. Swift
Attorney

March 11, 1924.  1,486,117

R. ASCHENBACH

CHICKEN BROODER

Filed April 12, 1923   2 Sheets-Sheet 2

Inventor
R. Aschenbach
By D. Swift
Attorney

Patented Mar. 11, 1924.

1,486,117

UNITED STATES PATENT OFFICE.

RICHARD ASCHENBACH, OF SHEBOYGAN, WISCONSIN.

CHICKEN BROODER.

Application filed April 12, 1923. Serial No. 631,614.

*To all whom it may concern:*

Be it known that I, RICHARD ASCHENBACH, a citizen of the United States, residing at Sheboygan, in the county of Sheboygan, State of Wisconsin, have invented a new and useful Chicken Brooder; and I do hereby declare the following to be a full, clear, and exact description of the invention, such as will enable others skilled in the art to which it appertains to make and use the same.

The invention relates to chicken brooders and has for its object to provide a chicken brooder which is compact in form, and one wherein crowding of the chicks within the brooder is prevented.

A further object is to provide in combination with a brooder, a member extending around the chick compartment, which member is formed from a relatively wide strip, on which the chicks may stand, the inner side of the strip is bevelled downwardly thereby preventing chicks from crowding each other against the side of the brooder. The bevel not only prevents the chicks from being crowded against the sides of the brooder, but also prevents the chicks from getting a foot hold so that they crowd the chicks on the member.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
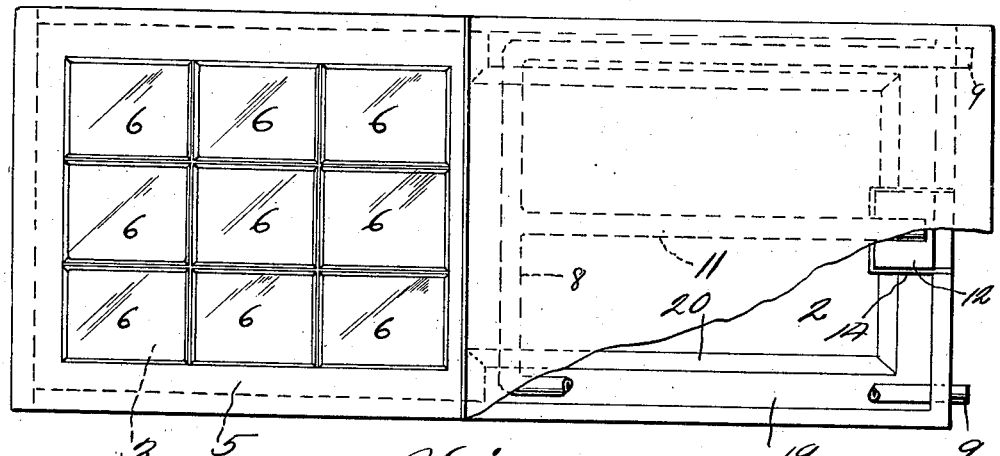
Figure 1 is a top plan view of the brooder.
Figure 2:
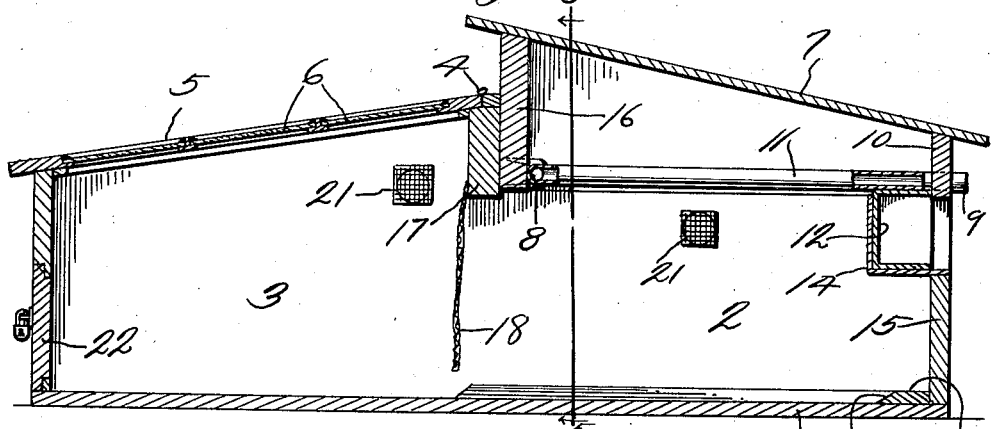
Figure 2 is a vertical longitudinal sectional view through the brooder.
Figure 3:
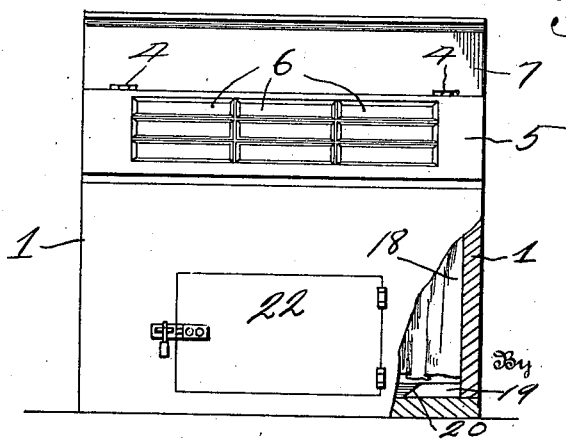
Figure 3 is a front elevation of the brooder.
Figure 4:
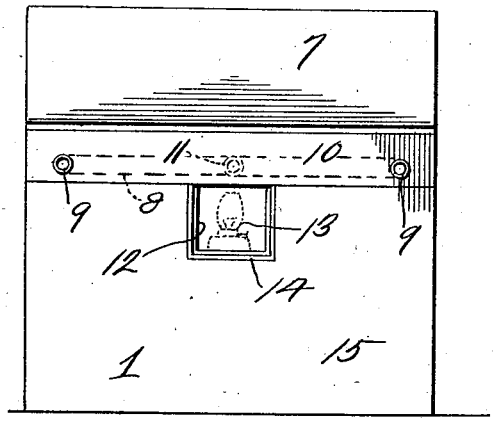
Figure 4 is a rear elevation.
Figure 5:
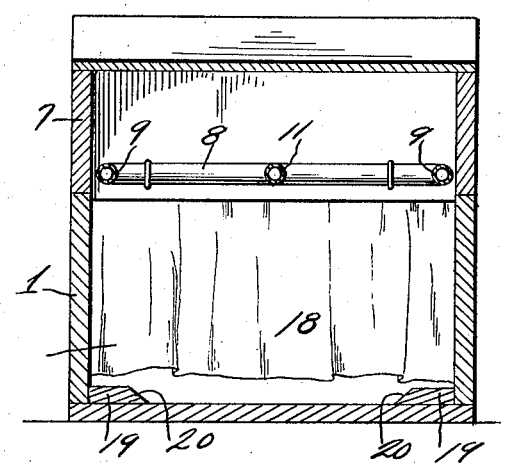
Figure 5 is a vertical transverse sectional view through the brooder taken on line 5—5 of Figure 2.
Figure 6:
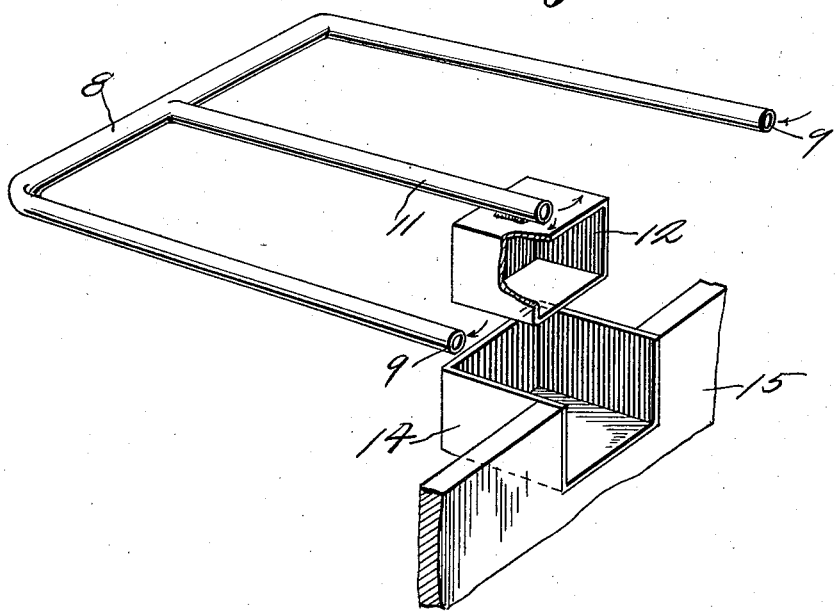
Figure 6 is a detail perspective view of portions of the heating system.

Referring to the drawing, the numeral 1 designates a rectangular shaped body of a brooder, 2 the brooder chamber therein and 3 the runway. Disposed above the runway compartment 3 and hingedly connected at 4 is a cover 5, which is preferably provided with glass members 6, through which the chicks in the compartment 3 may be observed. Disposed above the brooder compartment is a removable cover 7, in which cover a U-shaped pipe 8 is disposed, which pipe has its intake ends 9 extending through the wall 10 of the cover whereby fresh air may pass to the brooder compartment through the branch pipe 11, which is carried by the lamp receiving box 12. The lamp 13, which is disposed within the box 12 heats the air before it enters the brooder compartment, and at the same time causes a flow of air through the intake ends 9 of the pipe 8, consequently a continuous circulation of air is maintained in the brooder, which air is preheated before entering the brooder, thereby insuring the proper heating of the incubator. The box 12 is received within the member 14 carried by the wall 15 of the body 1, therefore it will be seen that the removable cover 7 may be easily and quickly positioned on the upper portion of the body 1 with its inner wall 16 in engagement with the transversely disposed wall 17.

Extending downwardly from the wall 17 is a fabric curtain 18, which maintains the heat within the brooder compartment 2, however allows sufficient heat to enter the runway compartment 3, into which runway compartment the chicks go. It has been found within the brooder compartment 2, the chicks crowd each other to such an extent that they are smothered or injured. To obviate this difficulty, the brooder compartment 2 has disposed therein in engagement with its walls a strip 19, said strip is of sufficient width to allow a chick to stand thereon, and has its forward edge downwardly and inwardly bevelled as at 20, which bevelled edge will prevent a chick from easily crowding on the strip, as the chicks will be unable to secure a firm foot hold on the inclined bevelled 20 for crowding purposes. Strip 19 extends around the entire brooder chamber 2 where the young chicks are placed, and in which compartment the chicks crowd each other. The side walls of the body 1 are provided with screened openings 21, through which a person may look to observe the chicks within the brooder, and access may be had to the runway compartment 3, either by lifting the cover 5 or by opening the door 22.

From the above it will be seen that a brooder is provided, which is simple in construction, one wherein a strip is provided in the brooder chamber and constructed in such a manner that the chicks within the brooder chamber cannot crowd each other.

The invention having been set forth what is claimed as new and useful is:—

1. The combination with a brooder chamber, said chamber being formed by walls and a floor, of a U-shaped member disposed within the chamber in engagement with the floor and walls, the inner sides of the U-shaped member being bevelled and inclining downwardly and inwardly.

2. A brooder comprising a body member having a brooder compartment and a runway compartment, a removable cover carried by the brooder compartment, said cover being provided with a U-shaped pipe having its arms extending through the outer wall of the cover, a centrally disposed pipe carried by the U-shaped pipe in parallel relation to the arms thereof, a lamp receiving casing carried by the centrally disposed pipe, said casing when the cover is positioned on the body member being received in a casing carried by the end wall of the body member.

In testimony whereof I have signed my name to this specification in the presence of two subscribing witnesses.

RICHARD ASCHENBACH.

Witnesses:
MAX SCHURRER,
JOE MERKLE.